United States Patent [19]

Piltch

[11] Patent Number: 4,477,746
[45] Date of Patent: Oct. 16, 1984

[54] MICROWAVE-TRIGGERED LASER SWITCH

[75] Inventor: Martin S. Piltch, Los Alamos, N. Mex.

[73] Assignee: The United States of America as represented by the United States Department of Energy, Washington, D.C.

[21] Appl. No.: 379,797

[22] Filed: May 19, 1982

[51] Int. Cl.³ .......................... H01J 7/46; H01J 19/80
[52] U.S. Cl. ..................................... 315/39; 307/107; 363/111; 331/127; 333/13
[58] Field of Search ................... 315/39; 307/106, 107; 331/127; 363/108, 111, 112, 117; 333/13, 101

[56] References Cited

U.S. PATENT DOCUMENTS

| | | | |
|---|---|---|---|
| 3,360,678 | 12/1967 | Kerns | 307/106 X |
| 3,484,619 | 12/1969 | Proud, Jr. | 307/106 |
| 3,521,121 | 7/1970 | Proud, Jr. | 307/106 X |
| 3,681,656 | 8/1972 | Mitchell | 307/107 |
| 4,003,007 | 1/1977 | Stewart | 307/106 |
| 4,028,583 | 6/1977 | Bigham | 315/39.53 |
| 4,104,558 | 8/1978 | Proud, Jr. | 315/39 |

FOREIGN PATENT DOCUMENTS 486397  4/1976  U.S.S.R. ........................... 315/39.53

Primary Examiner—Saxfield Chatmon
Attorney, Agent, or Firm—Leonard C. Brenner; Paul D. Gaetjens; Michael F. Esposito

[57] ABSTRACT

A high-repetition rate switch for delivering short duration, high-power electrical pulses from a pulsed-charged dc power supply. The present invention utilizes a microwave-generating device such as a magnetron that is capable of producing high-power pulses at high-pulse repetition rates and fast-pulse risetimes for long periods with high reliability. The rail-gap electrodes provide a large surface area that reduces induction effects and minimizes electrode erosion. Additionally, breakdown is initiated in a continuous geometric fashion that also increases operating lifetime of the device.

9 Claims, 2 Drawing Figures

MICROWAVE-TRIGGERED LASER SWITCH

This invention is the result of a contract with the Department of Energy (Contract No. W-7405-ENG-36).

BACKGROUND OF THE INVENTION

The present invention pertains generally to pulse-circuit devices and more particularly to high-power switches.

With the advent of pulse lasers and other devices which require high-power electrical-pulse energy for operation such as high-energy lasers and electron-beam accelerators, the requirements for a device capable of producing repetitive high-power pulses of electrical energy have increased greatly. For example, pulsed lasers are now being used in industrial applications for many purposes such as welding and supplying energy to specific chemical reactions. For example, pulsed lasers can be used as a source to clean exhaust gases from combustion by selectively decomposing noxious substances. Simularly, feed stocks for chemical processes can be purified by selective destruction of contaminates. The process of coal gasification can be enhanced using a high-pulse power laser to remove impurities that would adversely effect catalysts used in the gasification process. Moreover, isotope separation processes can be carried out using pulsed lasers to supply feed stocks of elements enriched in a particular isotope. For example, $^{235}U$ has been enriched using laser isotope separation processes that employ pulsed lasers to supply a feed stock of uranium for nuclear fission plants.

In order to satisfactorily implement pulsed lasers in industry, long lifetimes and a high degree of reliability are required by these devices. In the past, spark gaps and thyratrons have been used to switch pulse energy with fast-pulse risetimes and high-pulse repetition rates. However, these devices have been unable to provide the necessary pulse repetition rate, pulse risetime, longevity, and reliability necessary for industrial applications.

Considerable effort has been expended to develop a device that is capable of providing high-power dc pulses at high-pulse repetition rates with longevity and reliability. The proceedings of the workshop on repetitive-opening switches (Jan. 28-30, 1981, Durango, Colo.) published Apr. 20, 1981 discloses various opening switches that attempt to provide high-power dc pulses with fast risetimes at high-pulse repetition rates. For example, some of the methods disclosed for achieving repetitive energy transfer include the use of a dense plasma-focus switch, an electron beam-controlled switch, a magnetically-controlled vacuum arc switch, and multiple-fused or explosively actuated switches. None of these devices are capable of providing high-power dc pulses with fast risetimes at high-pulse repetition rates with the necessary reliability and longevity required for industrial applications.

SUMMARY OF THE INVENTION

It is therefore an object of the present invention to provide an improved switch.

It is also an object of the present invention to provide a high repetition-rate switch for delivering short duration, high-power electrical pulses.

Another object of the present invention is to provide a device for producing high-power dc pulses at high-pulse repetition rates.

Another object of the present invention is to provide a high-repetition rate switch for delivering high-power electrical pulses with fast-pulse risetimes for long periods with high reliability.

Another object of the present invention is to provide a high-repetition rate switch for delivering short duration, high-power electrical pulses with reduced induction effects.

Another object of the present invention is to provide a device for producing high-power dc pulses at high-pulse repetition rates for long periods with high reliability.

Another object of the present invention is to provide a device for producing high-power dc pulses at high-pulse repetition rates with reduced induction effects.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the apparatus of this invention may comprise a high-repetition rate switch for delivering short duration, high-power electrical pulses from a power supply comprising: a microwave waveguide; rail electrodes forming an integral part of said microwave waveguide, said rail electrode connected to said power supply such that said power supply produces an electric field between said electrodes near breakdown potential; microwave generator means connected to said microwave waveguide for producing microwave pulses having sufficient energy to distort said electric field to cause breakdown between said rail electrodes; whereby said rail electrodes provide a large conduction area that reduces induction effects of said switch and minimizes electrodes erosion.

The present invention may also comprise, in accordance with its objects and purposes, a device for producing high-power dc pulses at high-pulse repetition rates comprising: a structure capable of propagating high-power microwave pulses; rail electrodes disposed in said structure; pulse-charged dc power source means connected to said rail electrodes for producing a dc electrical field between said rail electrodes near breakdown potential; microwave pulse generator means for producing microwave pulses having sufficient energy to distort said dc electric field to initiate a progressive geometric breakdown across the surface of said rail electrodes for each pulse produced by said microwave pulse generator means; whereby said rail electrodes provide a large conduction area that reduces induction effects of said switch and minimizes electrode erosion.

The advantages of the present invention are that high-power dc pulses can be provided for the first time at high-pulse repetition rates with fast-pulse risetimes for extended periods with the extremely high reliability characteristic of microwave sources. The present invention minimizes the effects of induction in the switching mechanism, reduces electrode erosion, and utilizes readily available devices that have proven reliability and longevity.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE PREFERRED EMBODIMENT(S) OF THE PRESENT INVENTION

Figure 1:
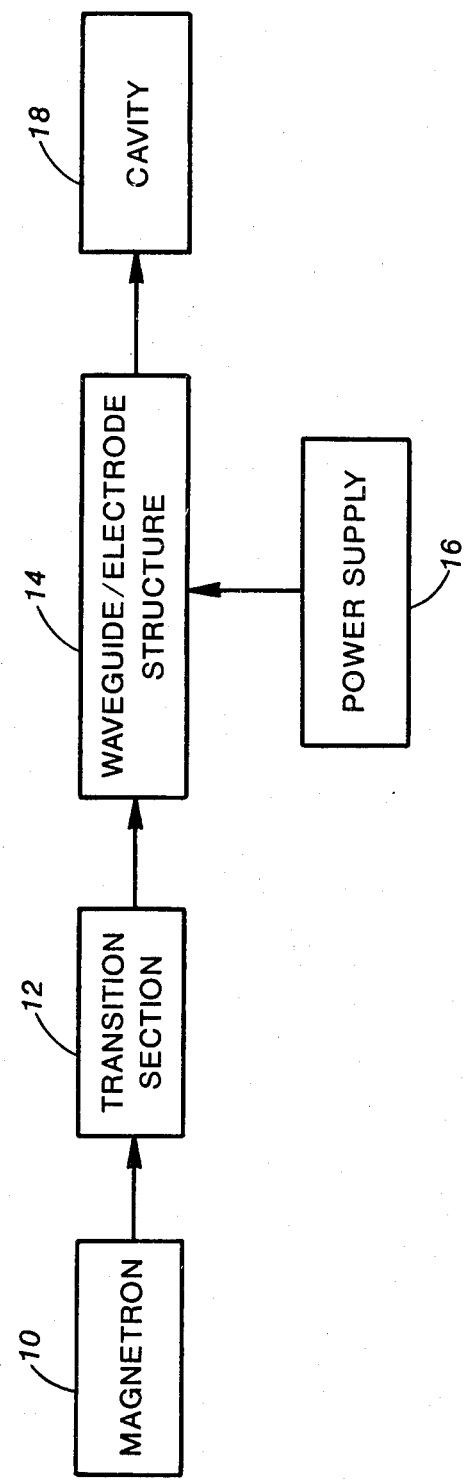
FIG. 1 is a schematic block diagram of the device of the present invention.

FIG. 1 is a schematic block diagram of the present invention. The present invention as illustrated in FIG. 1, utilizes a magnetron that is capable of producing high-power microwave pulses with extremely fast-pulse risetimes. Of course, any suitable high-power microwave generator device can be utilized in accordance with the present invention. However, magnetrons, such as coaxial magnetrons along with the associated power supplies and triggering electronics, are rated at more than 10,000 hours of continuous service in applications such as military radar and air-traffic control operations. Additionally, these devices are capable of producing megawatt microwave-power pulses. The highly developed technology of the magnetron provides the basis for producing high-power pulses at high-pulse repetition rates for long periods with the requisite reliability to operate the device of the present invention.

The magnetron 10 is connected to a transition section 12 that matches the characteristic impedance of the output of magnetron 10 to the characteristic impedance of the waveguide/electrode structure 14. In essence, the transition section provides a uniform surface that converts the rectangular shape of the output waveguide of magnetron 10 to the rectangular shape of the waveguide/electrode structure 14 (which has a different aspect ratio) so that there is no power reflection back into magnetron 10 that would adversely effect its operation. Of course, waveguide structure 14 can be fabricated to minimize the effects of impedance matching with magnetron 10.

The waveguide/electrode structure contains rail electrodes 28 and 30 having a Rogowski or Chang profile. This electrode shape provides for a uniform electric field between the electrodes established by power supply 16. The rail electrodes extend along the length of the waveguide structure in the direction of propagation of the microwave beam. The electrodes provide a large, uniform volume in which the electric field is established in the waveguide structure 14 as well as partially guiding the microwave field.

Absorption cavity 18 provides a matched microwave load to substantially absorb all the microwave pulse propagated by the waveguide/electrode structure 14 to prevent reflection in the reverse direction.

Figure 2:
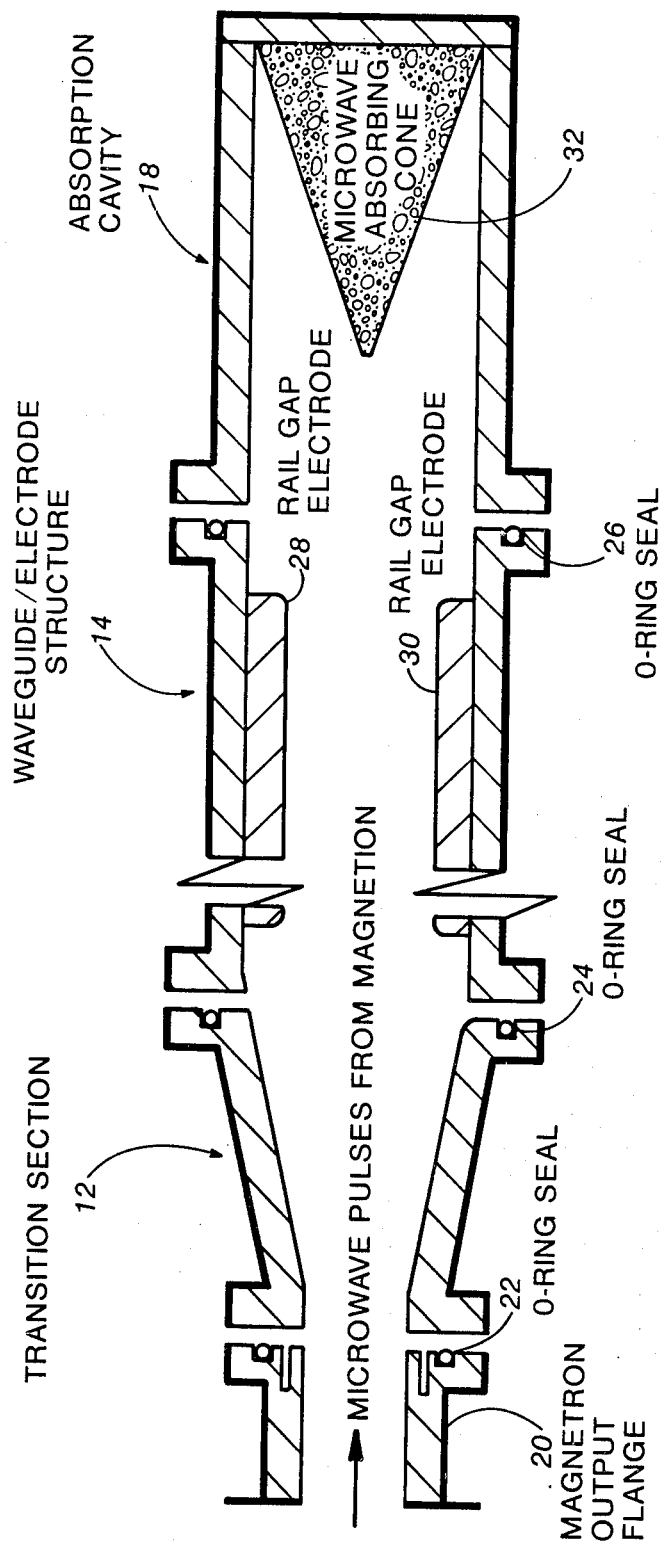
FIG. 2 is a schematic cross-sectional diagram of a portion of the present invention.

FIG. 2 is a cross-sectional diagram of the device of the present invention. The magnetron-output flange 20 is coupled directly to the transition section 12. An O-ring seal 22 is disposed to provide the proper sealing mechanism. In a similar manner, transition section 12 is coupled to the waveguide/electrode structure 14. A similar O-ring 24 is disposed between the coupling surfaces. O-ring seal 26 also provides a seal between the waveguide/electrode structure 14 and absorption cavity 18. As shown in FIG. 2, rail-gap electrodes 28 and 30 are disposed in a longitudinal manner along the length of the waveguide structure 14. Absorption cavity 18 contains a microwave absorbing cone 32 which functions to substantially absorb microwave pulses propagated along the length of the structure illustrated in FIG. 2.

In operation, magnetron 10 produces a continuous series of microwave pulses having fast-pulse risetimes and powers ranging up to the megawatt power level. These high-power microwave pulses are transmitted into transition section 12 for propagation into the waveguide/electrode structure 14. Rail-gap electrodes 28 and 30 are connected to power supply 16 that comprises a dc power supply which is capable of biasing the rail-gap electrodes 28 and 30 at a potential just below the electric-field breakdown potential. The waveguide/electrode structure 14 is pressurized at a fairly high pressure to increase the breakdown voltage so that high dc-switching voltages can be obtained from the apparatus. The device can be pressurized with various gases including $N_2$, $SF_6$, argon, and, more advantageously, air. The advantage of using air is that the oxygen helps to keep the electrodes clean and is significantly less costly than the above-mentioned gases. Moreover, leakage does not become a problem when air is utilized. Also, air can be readily circulated and pressurized within the waveguide/electrode structure using a circulation pump. Additionally, propagation of microwave pulses through the waveguide/electrode structure 14 is consistent with high-pressure operation and close spacing between the rail-gap electrodes 28 and 30.

Rail-gap electrodes 28 and 30 are biased by a predetermined amount below the breakdown potential. When the microwave pulse enters a region between electrodes 28 and 30, a microwave electric field is impressed in waveguide 14 which distorts the dc field between the rail-gap electrodes such that the gap is overvolted and breakdown occurs. The discharge is initiated in a continuous fashion across the surface of the rail-gap electrodes. This initiation of the breakdown action in a continuous geometric fashion over a fairly large surface area of the rail-gap electrodes causes the electrical inductance of the system to be much reduced over a single channel gap or a rail-gap breakdown with noncontinuous triggering. Moreover, electrode erosion is significantly reduced because of the large surface area of the electrodes and the continuous initiation of breakdown in a geometric fashion.

The power supply, which comprises a command charged pulse forming line, is designed to supply a predetermined amount of energy to sustain a breakdown for a desired, predetermined period. At the end of this predetermined period, the voltage of the power supply drops below a level at which breakdown can be sustained and the breakdown is discontinued. The pulse-charged power supply is also designed to fully recharge before the next microwave pulse is produced by magnetron 10. The microwave pulses exiting from the waveguide/electrode structure 14 are absorbed in the absorption cavity by the microwave absorbing cone 32 which prevents reflection of the signal in a reverse direction.

The present invention therefore provides a device for producing high-power dc pulses at high-pulse repetition rates that is capable of operating for long periods with high reliability. The device reduces the effects of induction and electrode erosion by the use of rail-gap electrodes with large surface areas and the initiation of breakdown in a continuous geometric fashion. High-pressure operation in the region between the rail-gap electrodes allows for high-voltage operation of the device in a small structure. The highly developed technology of magnetrons provides the basis for the longevity and reliability of operation of the present invention as well as providing the necessary pulse-repetition frequencies and fast-pulse risetimes that are desirable.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A switch for switching high-power electrical pulses from a power supply comprising:

a microwave waveguide;

a pair of opposing rail electrodes forming an integral part of said microwave waveguide, said pair of rail electrodes biased by said power supply such that said power supply produces an electric field between said pair of rail electrodes near breakdown potential; and microwave generator means connected to said microwave waveguide for producing microwave pulses past said pair of rail electrodes having sufficient energy to distort said electric field to cause breakdown between said rail electrodes, whereby said pair of rail electrodes provide a large conduction area that reduces induction effects of said switch and minimizes electrode erosion.

2. The switch of claim 1 further comprising a microwave load connected to said microwave waveguide opposite said microwave generator means for absorbing microwave energy.

3. The switch of claim 1 wherein said microwave generator means comprises a magnetron.

4. The switch of claim 1 further comprising a transition section disposed between said microwave generator means and said microwave waveguide to match the characteristic impedence of said microwave generator means to the characteristic impedence of said microwave waveguide.

5. A device for producing high-power dc pulses at high-pulse repetition rates comprising:

a structure capable of propagating high-power microwave pulses, said structure having a pressurized internal environment;

a pair of opposing rail electrodes disposed in said structure;

dc power source means biasing said rail electrodes for producing a dc electric field between said pair of rail electrodes near breakdown potential; and microwave pulse generator means for producing microwave pulses having sufficient energy to distort said dc electric field to initiate a progressive geometric breakdown across the surfaces of said pair of rail electrodes for each pulse produced by said microwave pulse generator means, whereby said pair of rail electrodes provide a large conduction area that reduces induction effects of said switch and minimizes electrode erosion.

6. The device of claim 5 further comprising a microwave load connected to said microwave waveguide opposite said microwave pulse generator means for absorbing microwave energy.

7. The device of claim 5 wherein said pressurized internal environment of said structure capable of propagating high-power microwave pulses is refreshed at a rate commensurate with a desired switching rate.

8. The device of claim 7 wherein said microwave pulse generator means comprises a magnetron that produces high-repetition rate microwave pulses with fast risetimes.

9. The device of claim 5 further comprising a transition section disposed between said structure capable of propagating high-power microwave pulses and microwave pulse generator means to match the characteristic impedance of said microwave pulse generator means to the characteristic impedance of said structure capable of propagating high-power microwave pulses.

* * * * *